United States Patent
Baier-Welt et al.

(10) Patent No.: US 8,006,814 B2
(45) Date of Patent: Aug. 30, 2011

(54) BRAKE WITH SPINDLE AND CAM DISK ARRANGEMENT

(75) Inventors: Christian Baier-Welt, Ober-Ramstadt (DE); Theo Baukholt, Kriftel (DE); Hendrik Powileit, Schmitten (DE)

(73) Assignee: Continental Automotive GmbH, Hannover (DE)

( * ) Notice: Subject to any disclaimer, the term of this patent is extended or adjusted under 35 U.S.C. 154(b) by 352 days.

(21) Appl. No.: 12/282,477

(22) PCT Filed: Feb. 23, 2007

(86) PCT No.: PCT/EP2007/051765
§ 371 (c)(1),
(2), (4) Date: Sep. 10, 2008

(87) PCT Pub. No.: WO2007/107427
PCT Pub. Date: Sep. 27, 2007

(65) Prior Publication Data
US 2009/0095580 A1 Apr. 16, 2009

(30) Foreign Application Priority Data
Mar. 17, 2006 (DE) .................... 10 2006 012 440

(51) Int. Cl.
*F16D 55/08* (2006.01)
(52) U.S. Cl. ..................... 188/72.7; 188/72.8
(58) Field of Classification Search ......... 188/72.7–72.9
See application file for complete search history.

(56) References Cited

U.S. PATENT DOCUMENTS

| | | | | |
|---|---|---|---|---|
| 4,022,300 A * | 5/1977 | Afanador et al. | ............ | 188/72.1 |
| 5,038,895 A * | 8/1991 | Evans | ............ | 188/72.7 |
| 6,264,011 B1 | 7/2001 | Zernickel | ............ | 188/72.8 |
| 6,662,908 B2 * | 12/2003 | Gradert et al. | ............ | 188/72.9 |
| 7,815,021 B2 * | 10/2010 | Baumgartner et al. | ...... | 188/72.9 |
| 2005/0034939 A1 * | 2/2005 | Kramer | ............ | 188/162 |
| 2005/0145448 A1 * | 7/2005 | Watanabe et al. | ............ | 188/72.1 |
| 2005/0145449 A1 * | 7/2005 | Jelley et al. | ............ | 188/72.7 |
| 2005/0258682 A1 * | 11/2005 | Halasy-Wimmer et al. | .... | 303/89 |
| 2007/0068747 A1 * | 3/2007 | Barbosa | ............ | 188/72.7 |

FOREIGN PATENT DOCUMENTS

| | | |
|---|---|---|
| DE | 19853721 | 6/1999 |
| DE | 19850923 | 5/2000 |
| FR | 2849136 | 6/2004 |
| WO | 03100282 | 12/2003 |

OTHER PUBLICATIONS

International Search Report and Written Opinion; PCT/EP2007/051765; pp. 10, Jul. 18, 2007.

\* cited by examiner

*Primary Examiner* — Christopher P Schwartz
(74) *Attorney, Agent, or Firm* — King & Spalding L.L.P.

(57) ABSTRACT

A brake, in particular for motor vehicles, has a friction member (1) which can be pressed an actuator (15) against or released from the friction face of an element (3) which is to be braked. The brake is equipped with a particularly simple and reliable readjustment device (7) and with an emergency release device (12), wherein the readjustment device has a spindle (9) which drives an adjustable element (8) which is connected thereto, and the emergency release device (12) has two cam disks (13, 14) which are rotatable relative to one another, one (14) of which cam disks is rotationally fixedly connected to the spindle (9).

29 Claims, 5 Drawing Sheets

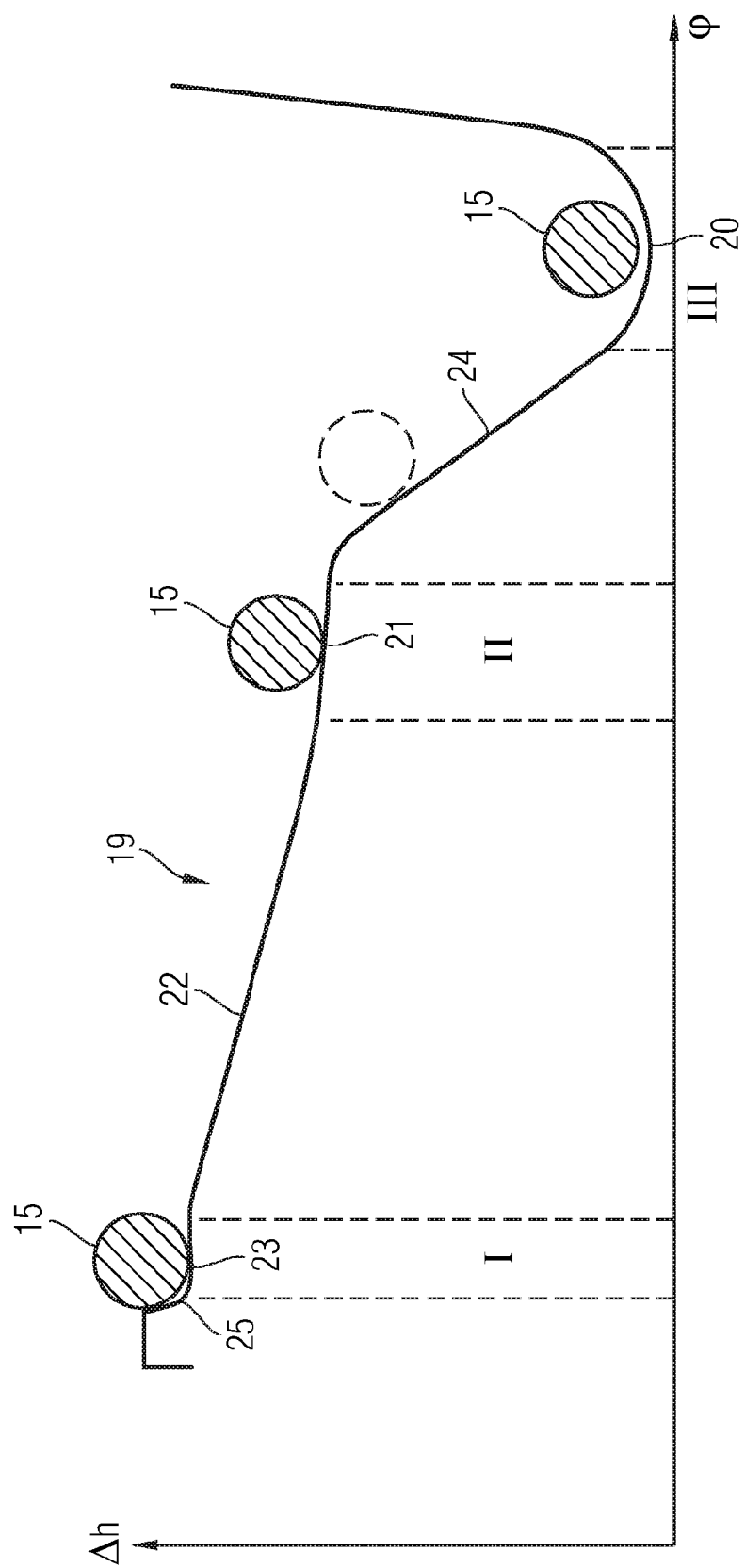

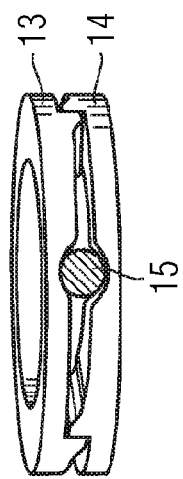
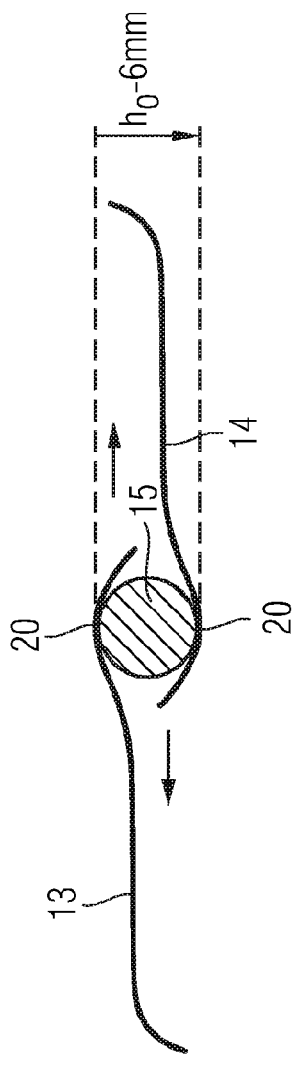
FIG 3A  FIG 3B
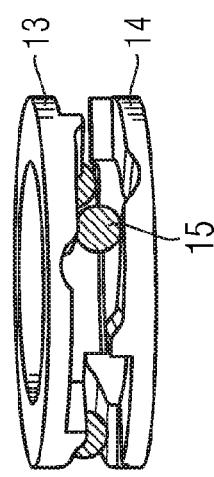
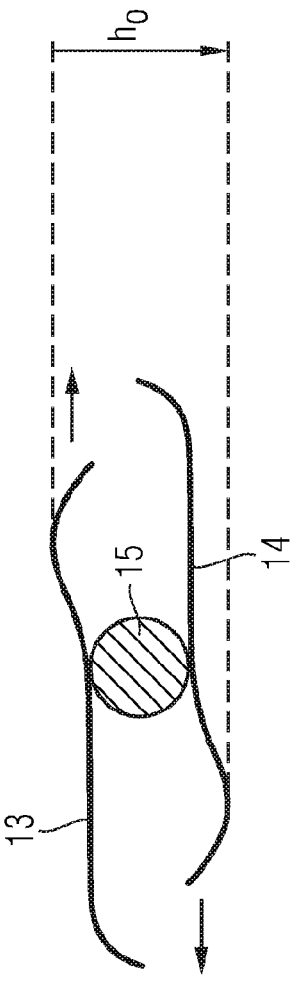
FIG 4A  FIG 4B
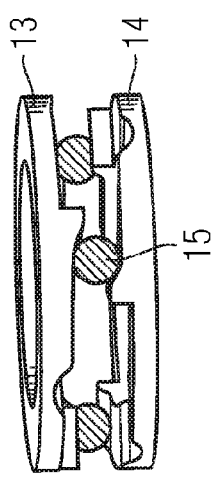
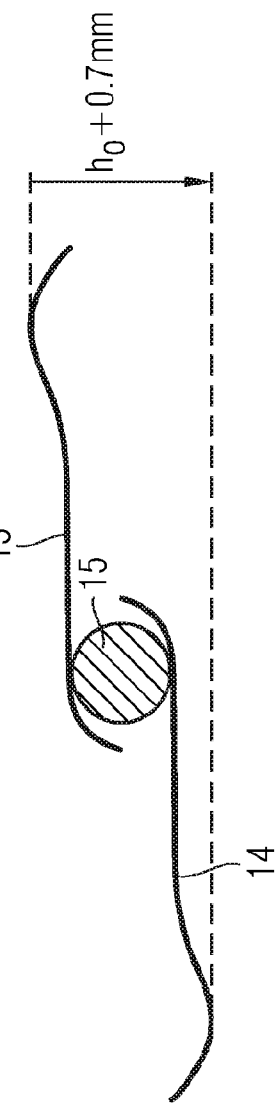
FIG 5A  FIG 5B

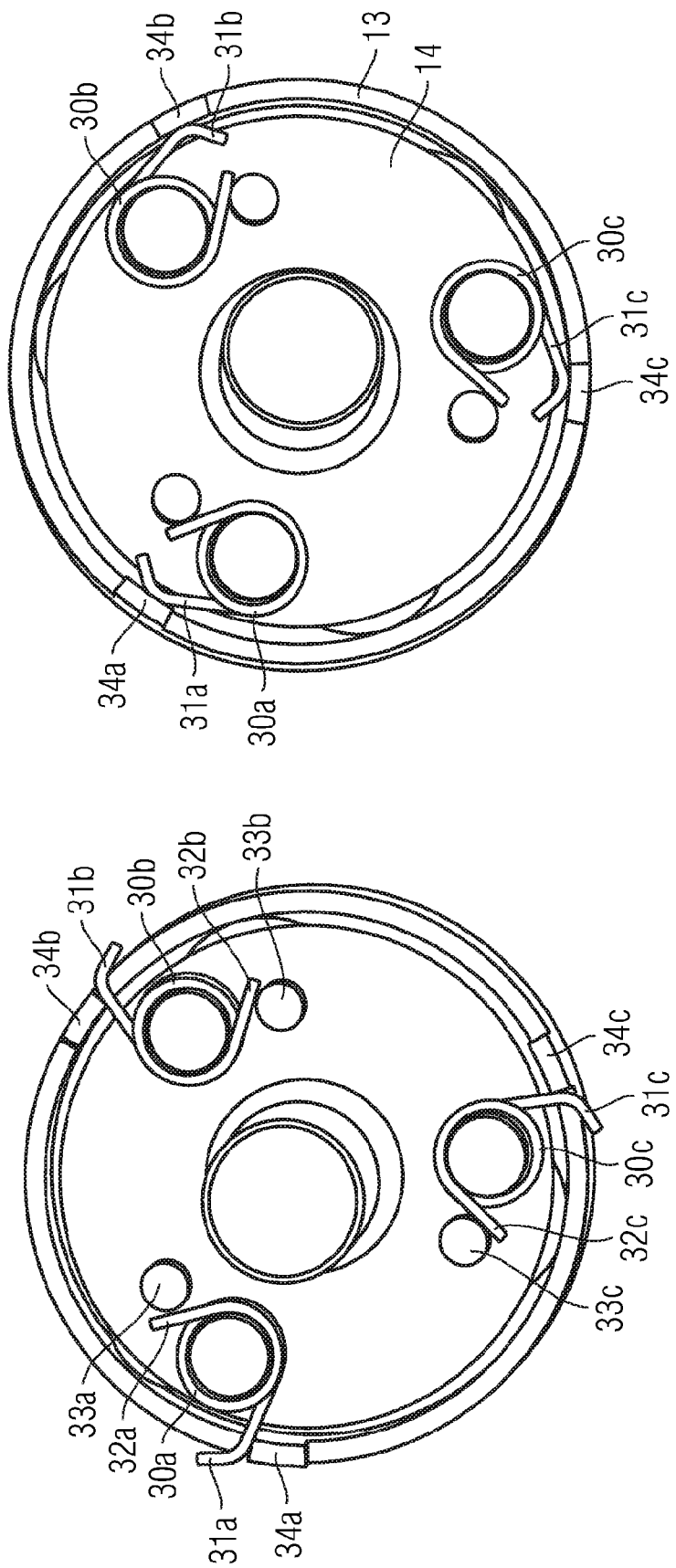

BRAKE WITH SPINDLE AND CAM DISK ARRANGEMENT

CROSS-REFERENCE TO RELATED APPLICATIONS

This application is a U.S. national stage application of International Application No. PCT/EP2007/051765 filed Feb. 23, 2007, which designates the United States of America, and claims priority to German application number 10 2006 012 440.5 filed Mar. 17, 2006, the contents of which are hereby incorporated by reference in their entirety.

TECHNICAL FIELD

The invention relates to a brake, in particular for motor vehicles, in particular to a self-energizing electromechanical brake.

BACKGROUND

The problem will firstly be explained with reference to self-energizing electromechanical brakes but relates equally to conventional electric brakes in which there is the risk that they will no longer release. This may be the case where the brake locks on account of a fault, for example a spindle breakage. Furthermore, there are electric brakes which can engage of their own accord—based upon energy stored in the vehicle or in the brake.

Self-energizing electromechanical brakes normally comprise an electrically actuated actuator, usually an electric motor, which presses a friction member with a friction lining against, and releases it from, an element, such as e.g. a brake disc, which is to be braked. When the brake is actuated, the friction member is carried along by the kinetic energy of the element to be braked and reinforces the braking effect automatically (self-energization).

Self-energizing electromechanical brakes are typically implemented as wedge brakes. Such a wedge brake is described e.g. in DE 198 19 564 C2 and is adequately known from many other printed publications. The wedge element is generally dimensioned such that the tangent of the wedge angle α corresponds approximately to an expected coefficient of friction μ between friction member and element to be braked. In this ideal case, the wedge element is neither pushed into nor pulled out of the gap so that the force to be applied by the actuator is equal to zero. Where coefficients of friction between friction member and element to be braked are unfavorable, i.e. high, on the other hand, relatively high tractional forces have to be applied by the actuator in order to hold the friction member firm. If in this state the actuator fails, the friction member is carried along unimpeded and the brake can lock suddenly. In the case of a motor vehicle wheel brake, this must be prevented at all events.

In order to prevent locking of the brake, various emergency release devices are known from the prior art. The known emergency release devices are, however, usually very complicated in structure and require a fairly large number of components.

Self-energizing brakes comprise in many cases also a lining-wear-readjustment device, by means of which the air gap between brake lining and brake disk, particularly in worn brakes, can be readjusted. Known readjustment devices usually contain their own actuator, e.g. an electric motor, and further components. As a result, the entire wheel brake with all auxiliary devices becomes very complex, elaborate and expensive and requires a relatively large amount of installation space.

SUMMARY

A brake can be created, in particular a motor vehicle brake, which comprises both a lining-wear-readjustment device and an emergency release device, but which is substantially simpler in structure and, in addition, requires relatively little installation space.

According to an embodiment, a brake may comprise a friction member which is, by means of an actuator, pressed against or released from the friction face of an element which is to be braked, a readjustment device which comprises a spindle and an adjustable element which is driven by the spindle, and an emergency release device having two cam disks which are rotatable relative to one another, one of which cam disks is rotationally fixedly connected to the spindle.

According to a further embodiment, the readjustment device and the emergency release device can be arranged serially in a force flux path of the application force or of a force derived therefrom. According to a further embodiment, one of the cam disks can be motor-driven. According to a further embodiment, the cam disk which is not connected to the spindle may be driven. According to a further embodiment, the cam disk which is connected to the spindle may be driven. According to a further embodiment, the cam disk which is not connected to the spindle may be rotatably mounted. According to a further embodiment, the cam disks have an emergency release position, in which the cam disks may be closely spaced in relation to one another. According to a further embodiment, the cam disks may have a service brake position, in which the cam disks are intermediately spaced in relation to one another. According to a further embodiment, the cam disks may have a parking brake position, in which the cam disks are widely spaced in relation to one another. According to a further embodiment, rolling elements can be provided between the cam disks. According to a further embodiment, the cam disks can be axial cam disks. According to a further embodiment, in the service brake position of the cam disks a torque may act which seeks to bring about a rotation of the cam disks relative to one another in the direction of the emergency release position. According to a further embodiment, in the parking brake position, no torque may act which seeks to produce a rotation of the cam disks relative to one another. According to a further embodiment, the inclination of the cam disks in the service brake position can be configured such that the torque generated by the application force is substantially lower than the breakaway torque of the spindle. According to a further embodiment, the inclination of a cam segment adjacent to the parking brake position can be chosen such that the torque generated by the cam disks is significantly higher than the breakaway torque of the spindle. According to a further embodiment, the inclination of a cam segment adjacent to the emergency release position can be chosen such that the torque generated by the cam disks is greater than the breakaway torque of the spindle. According to a further embodiment, a pretensioning device can be provided by means of which the two cam disks are pretensioned relative to one another in the direction of the emergency release position. According to a further embodiment, the pretensioning device may comprise at least one spring element. According to a further embodiment, in the service brake position, a position regulation can be executed in respect of the cam position. According to a further embodiment, the readjustment device may comprise a wedge element, by means of which the application force of the brake is deflected. According to a further embodiment, the wedge element may slide on a plate. According to a further embodiment, the wedge element may interact with a thrust-bearing element which likewise has a wedge face. According to a further embodiment, an arresting or braking device can be provided for the cam disk which is not driven. According to a further embodiment, the arresting or braking device may comprise an electromagnet. According to a further embodiment, only a single motor can be provided for actuating both the readjustment device and the emergency release device. According to a further embodiment, the brake may be a self-energizing brake. According to a further embodiment, the actuator provided may be an electric actuator.

BRIEF DESCRIPTION OF THE DRAWINGS

The invention will be explained in detail below by way of example with reference to the attached drawings, in which:

FIG. 2 shows the shape of the curve of a cam disk from FIG. 1;

FIG. 3a shows a schematic representation of the release position of the cam disks from FIG. 1;

FIG. 3b shows a side view of the cam disks from FIG. 1 in the release position;

FIG. 4a shows a schematic representation of the service brake position of the cam disks from FIG. 1;

FIG. 4b shows a side view of the cam disks from FIG. 1 in the service brake position;

FIG. 5a shows a schematic representation of the parking brake position of the cam disks from FIG. 1;

FIG. 5b shows a side view of the cam disks from FIG. 1 in the parking brake position;

FIG. 6a shows a spring arrangement for rotating the cam disks relative to one another in the service brake position;

FIG. 6b shows the spring arrangement in the parking brake position;

DETAILED DESCRIPTION

Figure 1:
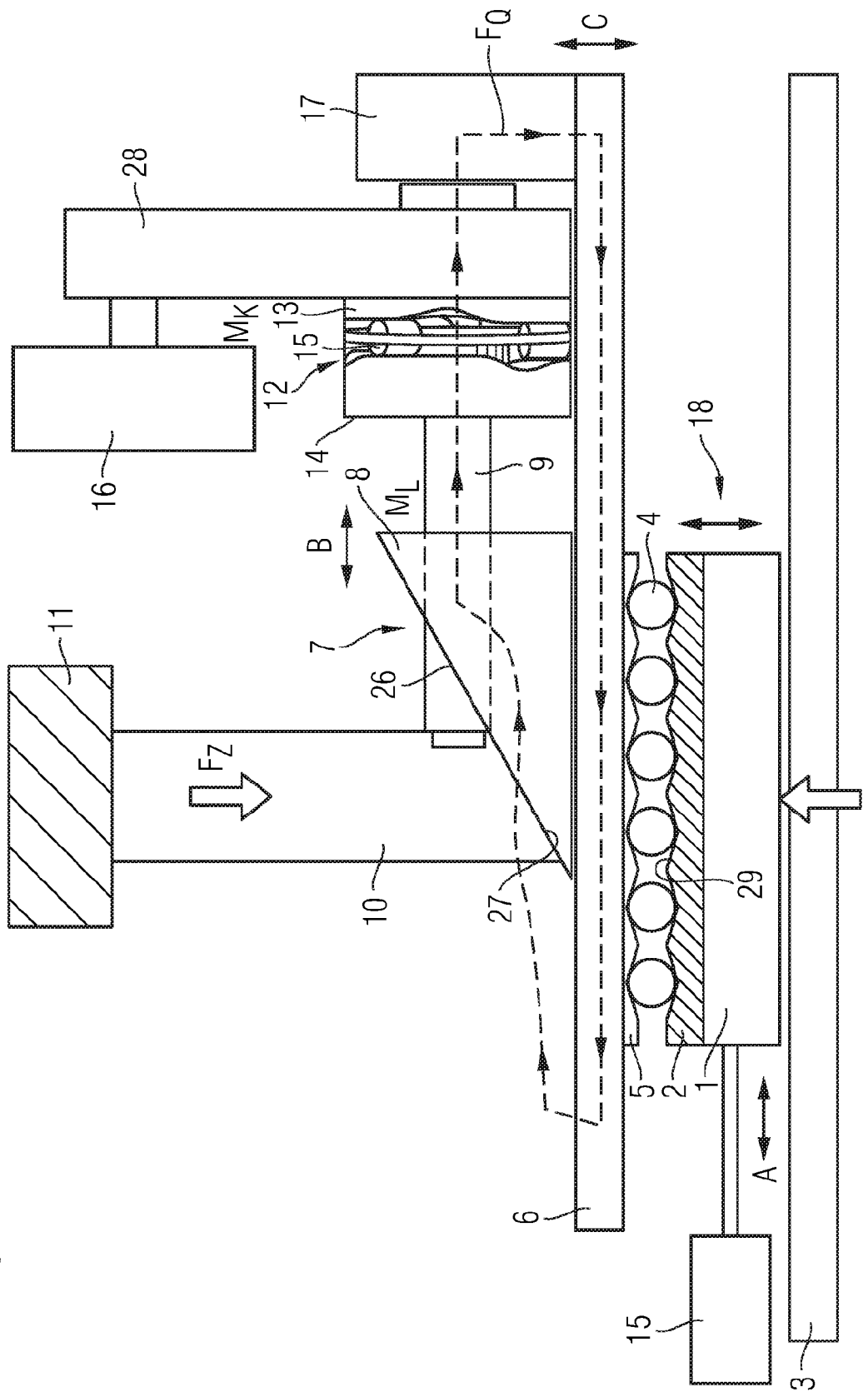
FIG. 1 shows a schematic side view of a self-energizing wedge brake comprising a readjustment device and an emergency release device according to a first embodiment.

According to various embodiments, an aspect consists in equipping a brake with a readjustment device comprising a spindle and an adjustable element which is actuated by the spindle and in additionally furnishing the brake with an emergency release device comprising two cam disks which are rotatable relative to one another, one of which cam disks is connected rotationally fixedly to the spindle and the other may be preferably axially rotatably mounted. The lining-wear-readjustment device and the emergency release device are arranged serially in a force flux path. Such a brake has the substantial advantage that it comprises very few components, is low in cost to produce and, in addition, requires relatively little installation space.

The readjustment of the brake is effected according to an embodiment by rotating the spindle, thereby driving the adjustable element which in turn acts upon the friction member and displaces this friction member relative to the friction face of the element which is to be braked.

The emergency release procedure, on the other hand, is effected by rotating the two cam disks. The cam disks are configured according to an embodiment such that, upon actuation of the brake, a torque is produced which seeks to rotate the two cam disks relative to one another. As a result of the rotation of the disks, the spacing of the disks changes. This longitudinal change is transferred via the spindle, the adjustable element and optionally further components to the friction member. Where the disks are suitably configured and the application force is sufficiently high, the brake can, in the event of a malfunction, be released within a few milliseconds.

The two cam disks can be preferably configured such that, depending on the operating mode, they are rotatable either together or relative to one another. The lining-wear-readjustment device may be preferably actuated by both cam disks being rotated together. The emergency release function, on the other hand, is produced by rotating the disks relative to one another.

Spindle and cam disks can be located in the force flux of the application force, but may be preferably arranged in a force flux path derived therefrom. The derivation of a force from the application force has the advantage that the spindle and the cam disks are less heavily loaded. To derive the force, a wedge element may be preferably provided which is arranged in the force flux of the application force. This wedge element preferably may form at the same time the element driven by the spindle.

According to an embodiment, only one of the cam disks is driven (the other preferably not). This may be either the disk not connected to the spindle or the disk connected to the spindle. An electric motor may be preferably provided as a drive. With this configuration of the brake, it is possible to drive the emergency release device and the readjustment device together by means of a single motor.

The cam disks may be preferably arranged with their cam tracks opposite one another. The two cam tracks may be preferably identical. Rolling elements may be preferably located between the cam tracks. The rolling elements can be fashioned, for example, spherically or cylindrically.

The cam disks may be preferably axial cam disks. This enables a relatively compact design.

The cam tracks of the disks may preferably be configured such that they define at least one service brake position and one emergency release position. In the service brake position, the cam disks are intermediately spaced relative to one another, whereas in the emergency release position that are closely spaced. The emergency release position of the disks may preferably be configured such that the brake can no longer be engaged even if actuated intensively.

The cam disks preferably also may define a parking brake position in which the cam disks are widely spaced relative to one another (more widely than in the service brake position). The parking brake position may preferably take the form of a kind of catching notch at which no torque rotating in opposing directions acts upon the cam disks. The parking brake position is therefore currentlessly self-sustaining.

The service brake position may preferably be configured such that, when loaded, a low torque acts upon the disks which seeks to rotate these disks relative to one another in the direction of the release position. In the event of a failure of the electric power supply, this consequently ensures that the disks will automatically move to the release position and the brake will automatically be released.

The inclination of the cam in the service brake position may preferably be chosen such that the torque generated by the application force is substantially lower than the breakaway torque of the spindle. This ensures that the spindle does not move during service braking. The cam disk connected to the spindle does not in this case necessarily have to be held.

A transition segment may preferably be located between the service brake position and the parking brake position, which transition segment has a somewhat greater inclination than the cam segment in the service brake position.

The inclination of a cam segment adjacent to the parking brake position may be preferably chosen such that the torque acting on the spindle is significantly higher than the breakaway torque of the spindle. The spindle can consequently be actuated by driving one of the cam disks.

The inclination of a cam segment lying between the service brake position and the emergency release position may preferably be chosen such that the torque exerted on the spindle and the cam disk is substantially greater than in the service brake position. The releasing of the brake is consequently accelerated once the rolling bearing runs along on this segment.

According to a special embodiment, the rotation of the cam disks in the direction of the release position is supported by a corresponding device. A pretensioning device, by means of which the two cam disks are pretensioned against one another in the direction of the release position, is proposed for this purpose. The pretensioning device may, for example, comprise one or more spring elements which pretension the cam disks against one another. In this way, the emergency release of the brake, particularly when the application force is low, can be accelerated substantially.

Upon actuation of the brake, a variable torque acts upon the cam disks, which torque seeks to rotate these disks. A position regulation may therefore preferably be executed for at least one of the cam disks in order to hold the cam disk in the service brake position.

The readjustment device preferably may comprise a wedge which is driven by the spindle. The wedge may preferably be arranged in the force flux path of the application force and diverts the application force, preferably perpendicular to the application force.

The wedge may preferably be arranged on a plate and slides on this plate in a forward and backward direction. The wedge element preferably may interact with a thrust bearing which has a corresponding wedge face.

In the particular embodiment of the brake in which the cam disk which is not connected to the spindle is driven, a braking device can be provided for the other cam disk. This ensures that the spindle does not rotate unintentionally.

In the particular embodiment of the brake in which the cam disk which is rotationally fixedly connected to the spindle is driven, an arresting or braking device can likewise be provided for the other cam disk. This prevents the driven cam disk from rotating unintentionally when the disk arrangement is loaded by the application force.

The said arresting or braking device preferably may comprise an electromagnet which holds the driven disk firmly in a predetermined position. In the event of a malfunction, it automatically releases the driven cam disk. A return spring, for example, can be provided in order to support this process.

The invention is applicable, in particular, to self-energizing brakes.

FIG. 1 shows a schematic side view of a self-energizing brake according to a first embodiment. The actual brake mechanism is labeled as a whole with the reference character 18. The brake 18 represented here is a motor vehicle wheel brake known in the art, comprising a movable wedge plate 2 which can be moved in the direction of the arrow A by an actuator 15 in order to engage or to release the brake.

The movable wedge plate 2 comprises on its front (below) a brake lining 1 which acts against the friction face of a brake disk 3. Multiple wedge faces 29 are provided on the back of the wedge plate 2, which wedge faces rest on an opposing wedge face 5 via rolling bearings 4 lying therebetween. The opposing wedge face 5 is arranged on a pressure plate 6.

When the brake 18 is actuated, the wedge plate 2 with the brake lining 1 moves along a movement track predetermined by the wedge faces 5, 29 parallel and perpendicular to the brake disk 3. The rolling bearings 4 serve in particular in reducing the sliding friction. The movable wedge plate 2 is, as it approaches the brake disk 3, carried along by it and consequently presses even harder against the brake disk 3 (self-energization).

The wedge brake shown is equipped with a readjustment device and an emergency release device which as integral items are designated here by the reference characters 7 and 12 respectively. The readjustment device 7 serves, as mentioned in the introduction, in readjusting the air gap, particularly in worn brakes. The emergency release device, on the other hand, serves in rapidly releasing the brake in the event of a malfunction such as e.g. a power failure.

The readjustment device 7 essentially comprises a wedge 8 and a spindle 9. The wedge 8 has an internal thread (not shown) and can be displaced parallel to the pressure plate 6 by rotating the spindle 9 in the direction of the arrow B. The wedge face 26 of the wedge 8 slides along a corresponding wedge face 27 of a thrust-bearing element 10 which is supported on the brake caliper 11. When the wedge is actuated, the pressure plate 6 and all the elements (16,17,13,14,28) connected thereto move in the direction of the arrow C toward or away from the brake disk 3. The air gap between brake lining 1 and brake disk 3 can consequently be adjusted as required, by rotating the spindle 9.

The wedge arrangement also serves in deflecting part of the application force $F_Z$ perpendicular to the application force $F_Z$. The derived force $F_Q$ is directed through the spindle 9 and the emergency release device 12 into a second thrust bearing 17 which is rigidly connected to the pressure plate 6. The entire arrangement, consisting of the readjustment device 7, emergency release device 12 and a motor drive 16,28 therefore moves in the direction of the arrow C.

The emergency release device 12 comprises two cam disks 13, 14 which stand opposite one another with their cam faces 19. Multiple rolling bearings 15 are arranged between the two cam disks 13, 14, which rolling bearings are held by a cage. In the exemplary embodiment shown, axial cam disks are used. However, radial cam disks could optionally also be used.

The cam disk 14 shown in the Figure on the left is rotationally fixedly connected to the spindle 9. The other cam disk 13 is rotatably mounted on the thrust bearing 17 and is driven by an electric motor 16 via a belt 28.

The two cam disks 13, 14 can, depending on the operating mode, be rotated either relative to one another or together, i.e. synchronously. When the two cam disks 13, 14 rotate relative to one another the spacing of the disks changes. This longitudinal change is transferred via the spindle 9, the wedge 8 and the pressure plate 6 to the wedge element 2 with the brake lining 1. When, on the other hand, the two cam disks 13, 14 are rotated simultaneously, the readjustment device 7 is actuated and the air gap thereby adjusted.

The cam disks 13, 14 have a characteristic cam shape with various cam segments which define different operating states of the brake, that is, in particular, a service break position, an emergency release position and a parking brake position. The individual cam segments are respectively used in the corresponding operating state of the brake.

FIG. 2 shows by way of example a cam shape 19 of one of the cam disks 13 or 14. As can be seen, the cam shape 19 comprises multiple segments 20-25 which are used in different operating modes of the brake 18. This cam shape 19 is repeated several times periodically along the periphery of a cam disk 13, 14, a rolling element 15 being assigned to each period. (In the present example, however, multiple rolling elements 15 are shown, in order to mark the most important operating positions of the cam disks 13, 14.) The key positions are a parking brake position I, a service brake position II and an emergency release position III.

In normal operating mode, the cam disks 13, 14 are arranged in the service brake position II. The rolling elements 15 are located in this case on a segment 21 which is inclined in the direction of the emergency release position III. The inclination of this segment 21 is chosen such that the torque acting on the cam disks 13, 14 during axial loading is substantially lower than the breakaway torque of the spindle 9. This prevents the spindle 9 from rotating during a braking procedure. The inclination of the segment 21 may for example be approximately 1°. In order, upon actuation of the brake 18, to hold the cam disk 13 in the service brake position II, a position regulation may be preferably executed.

In order to pass from the service brake position II to the parking brake position I, the cam disk 13 is driven accordingly by the motor 16. In this process, the rolling element 15 runs via a cam segment 22 to the parking brake position I. As a result of the movement, the spacing of the cam disks 13, 14 increases, as a result of which the brake 18 is tensioned increasingly. The segment 22 has a somewhat greater inclination, which may be e.g. 1.2°, than the segment 21. The inclination of the transition segment 22 is relatively uncritical, but it should be ensured that the rolling element 15 can pass to the parking brake position during the brake application movement.

In the parking brake position I, the associated segment 23 of the cam 19 is configured such that essentially no torque acts upon the cam disks 13, 14. The cam segment 23 has the shape of an energetic minimum or of a type of catching notch in which the rolling bearing 15 can catch. A cam segment 25 adjacent to the parking brake position I, on the other hand, has such a high inclination that the breakaway torque of the spindle 9 is significantly exceeded and the spindle 9 rotates when the cam disk 13 is driven by the motor 16. In this way, the two disks 13,14 can be rotated together. Here, the cam segment 25 forms as it were an end stop for the rolling element 15.

The service brake position II passes on the other hand into an emergency release position III. The associated segment 20 has the shape of an energetic minimum. In this state, the spacing of the cam disks 13, 14 is minimal, such that the wedge 8 (see FIG. 1) can wander far to the right and releases the brake 18 fully. The contour of the segment 20 may be preferably configured such that the brake 18 can no longer be applied even if actuated maximally.

Emergency release of the brake 18 essentially occurs as follows: during a power failure the motor 16 can no longer hold the disk 13, so the disk 13 automatically rotates relative to the cam disk 14 into the emergency release position III. In the process, the rolling bearing 15 rolls via the segment 24 into the emergency release position III. This can occur within a few milliseconds. The inclination of the segment 24 is chosen in this case such that the transition to the emergency release position III proceeds very rapidly. It may be e.g. 25°.

FIGS. 3 to 5 show the position of the cam disks 13, 14 in the individual positions I to III. The emergency release position III is shown firstly in FIG. 3*a*. As can be seen, the rolling element 15 is located between opposing emergency-release segments 20 of the cam disks 13, 14. The spacing h of the cam disks 13, 14 is minimal here and approximately 6 mm less than in the service brake position II (FIG. 4*a*).

FIG. 3*b* shows an associated side view of the cam disks 13, 14 in which the cam disks are located in the emergency release position III.

FIG. 4*a* shows the service brake position II of the cam disks 13, 14 in which the rolling elements 15 are located on opposing segments 21. The spacing h is labeled here with the value ho and is a few millimeters greater than in the emergency release position from FIG. 3*a*.

FIG. 4*b* shows an associated side view of the cam disks 13, 14 in which the cam disks are located in the service brake position II.

FIG. 5*a* shows the parking brake position III of the cam disks 13, 14. The rolling elements 15 are located between opposing cam segments 23. In comparison to the representation from FIG. 4*a*, the spacing h of the two cam disks 13, 14 has once again increased by a few millimeters.

FIG. 5*b* shows an associated side view of the cam disks 13, 14 in which the cam disks are located in the parking brake position I.

In the embodiment from FIG. 1, in which the cam disk 13 not connected to the spindle 9 is driven, the moment of inertia and frictional torque of the motor 16 including the gears 28 have to be overcome in order for the cam disk 13 to move from the service brake position II to the emergency release position III. Because of the low inclination of the cam 19 in the service brake position (segment 21), the torque $M_K$ required for this purpose may possibly not be achieved, particularly if the brake 18 is only loaded a little or not at all. A device is therefore provided by means of which the rotational movement of the cam disk 13 into the emergency release position III is supported.

FIGS. 6*a* and 6*b* show a pretensioning device which comprises multiple springs 30*a*-30*c*. The spring elements 30*a*-30*c* are arranged on a face of the driven cam disk 14. Each spring element 30*a*-30*c* comprises a first arm 31*a*-31*c* which engages with the driven cam disk 13 and a second arm 32*a*-32*c* which engages with the driven cam disk 14. The first arms 31*a*-31*c* rest against projections 34*a*-34*c* which are provided on the driven cam disk 13 and there project in the direction of the axis of the spindle 9.

In the service brake position II, the spring elements 30*a*-30*c* are pretensioned and exert a torque in the direction of the emergency release position III. If the motor 16 fails, the movement of the cam disks 13, 14 into the emergency release position is supported by this means.

FIG. 6*b* shows the spring arrangement in the parking brake position I. In this case, the two cam disks 13, 14 have rotated relative to one another so far that the first arms 31*a*-31*c* of the spring elements 30*a*-30*c* have bent inwardly so far that they lie against an inside of the projections 34*a*-34*c* . In this position, they no longer exert a torque on the cam disks 13, 14.

Figure 7:
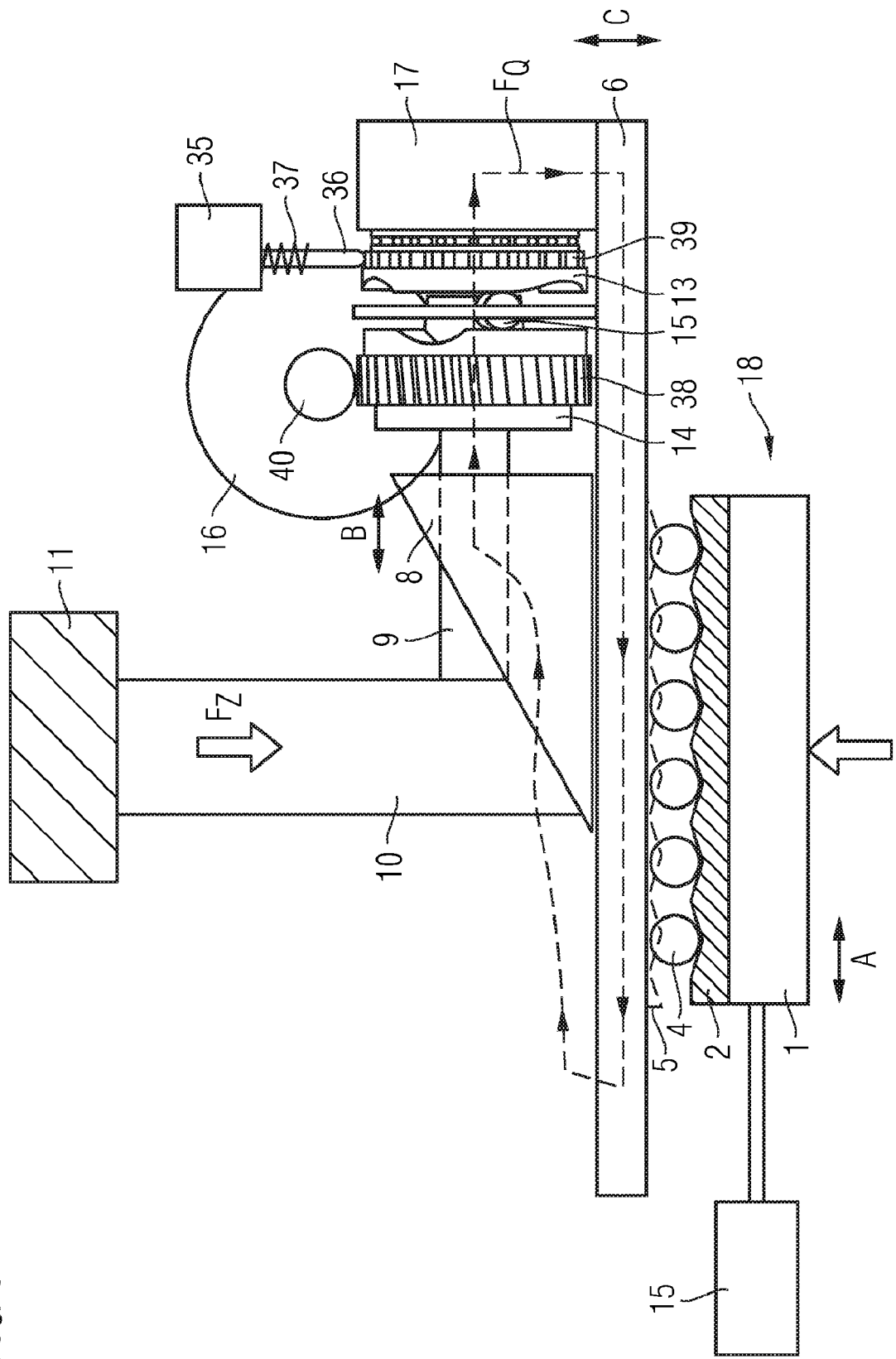
FIG. 7 shows a schematic side view of a self-energizing brake comprising a readjustment device and an emergency release device according to a second embodiment.

FIG. 7 shows a schematic representation of a self-energizing wedge brake which is constructed similarly to that in FIG. 1, but in which the cam disk 14 which is rotationally fixedly connected to the spindle 9 is motor-driven. The other cam disk 13 here is rotatably mounted and is not driven. In order to prevent the cam disk 13 which is not driven from rotating when the brake is actuated, an electromagnet 35 is provided as a holding means which holds the cam disk 13 in the energized state. The electromagnet 35 comprises a bolt 36 which engages in corresponding recesses 39 of the cam disk 13. The bolt 36 is pretensioned by means of a spring 37 in the direction of the retracted position. In the event of a malfunction, in particular a power failure, the bolt 36 is retracted very rapidly from the rest position by means of the return spring 37 and releases the cam disk 13. The cam disk 13 can rotate within a few milliseconds into the emergency release position and release the brake 18.

To activate the parking brake function, the left-hand cam disk 14 is driven by the motor 16 and rotated until such time as the cam disks 13, 14 are in the parking brake position I. Through further rotation of the disks—whereby both cam disks 13, 14 rotate synchronously, the brake 18 can be applied more powerfully. The cam disk 13 which is not driven is released in this case by the electromagnet 35 so as to enable rotation.

The drive of the cam disk 14 comprises in the present exemplary embodiment a motor 16 with only a single gear unit, which may be preferably implemented as a worm gear 38, 40. The shaft 40 of the motor 16 is furnished with a worm gear which engages with a corresponding toothing 38 on the outer periphery of the cam disk 14. One advantage of this embodiment over that from FIG. 1 is, in particular, that in the event of a malfunction only the driven cam disk 13 has to rotate. The emergency release is, due to the low moment of inertia of the cam disk 13, substantially faster than in the embodiment from FIG. 1, in which the gear unit 28 and the motor 16 also have to be rotated in order to release the brake.

Additional support for the emergency release by a pretensioning device, as represented by way of example in FIGS. 6a, 6b, can also be provided here, but is not absolutely necessary.

As shown in the introduction, the invention can be applied not only to self-energizing brakes but also to any electric brakes which due to a fault will no longer release automatically or which due to energy stored in the brake or in the vehicle can engage themselves. An example of the latter category is the following brake, the structure of which will be described:

Based upon an electromechanical brake with a member to be braked, at least one friction lining for frictionally engaging with the member to be braked, and an electric actuator for moving the friction lining to engage frictionally with the member to be braked, a reversible energy storage device which is operatively coupled with the electrical actuator is also provided, which reversible energy storage device interacts with an energy conversion device such that, upon actuation of the brake effected by means of the actuator, the energy stored in the energy storage device is output gradually, as the actuation path of the actuator increases, to the energy conversion device and is converted by this energy conversion device into an actuating torque which is transferred indirectly or directly to the friction lining, the actuating torque rising in a predetermined manner as the actuation path of the actuator increases, and such that, upon release of the brake, a brake-inherent restoring force, reacting upon the energy conversion device via the friction lining, recharges the energy storage device again. The concept proposed in the application would also be applicable to such a brake as a brake which can engage itself on the basis of energy stored in the vehicle.

LIST OF REFERENCE CHARACTERS 1 brake lining
2 wedge plate
3 brake disk
4 rolling bearing
5 wedge face
6 pressure plate
7 readjustment device
8 wedge
9 spindle
10 thrust bearing with wedge face
11 brake caliper
12 emergency release device
13 first cam disk
14 second cam disk
15 brake actuator
16 electric motor
17 thrust bearing
18 wedge brake
19 cam line
20 cam segment of emergency release position
21 cam segment of service brake position
22 cam segment for increasing strain
23 cam segment of parking brake position
24 cam segment of a readjustment position
25 end stop
26 wedge face of wedge 8
27 wedge face of thrust bearing 10
28 toothed belt
29 wedge face
30 spring element
31 first arm
32 second arm
33 end stop
34 projection
35 electromagnet
36 bolt
37 return spring
38 peripheral toothing of cam disk 14
39 recesses of cam disk 13
40 shaft with worm gear
A direction of movement of wedge plate 2
B direction of movement of wedge 8
C direction of movement of pressure plate 6
$F_Z$ application force
$F_Q$ derived force
I parking brake position
II service brake position
III emergency release position
h spacing of cam disks 13, 14
φ angle

The invention claimed is:

1. A brake comprising:
   a friction member which is, by means of an electrical actuator, pressed against or released from the friction face of an element which is to be braked,
   a readjustment device which comprises a spindle and an adjustable element which is driven by the spindle, and
   an emergency release device having two cam disks which are rotatable relative to one another, one of which cam disks is rotationally fixedly connected to the spindle and the other cam disk is not fixedly connected to the spindle, wherein the spindle is configured to be driven by a motor.

2. The brake according to claim 1, wherein one of the cam disks is motor-driven by said motor.

3. The brake according to claim 2, wherein the cam disk which is not fixedly connected to the spindle is driven by said motor.

4. The brake according to claim 3, wherein an arresting or braking device is provided for the cam disk which is fixedly connected to the spindle.

5. The brake according to claim 4, wherein the arresting or braking device comprises an electromagnet.

6. The brake according to claim 2, wherein the cam disk which is connected to the spindle is driven by said motor.

7. The brake according to claim 6, wherein an arresting or braking device is provided for the cam disk which is not fixedly connected to the spindle.

8. The brake according to claim 7, wherein the arresting or braking device comprises an electromagnet.

9. The brake according to claim 1, wherein the readjustment device comprises a wedge element, by means of which the application force of the brake is deflected.

10. The brake according to claim 9, wherein the wedge element slides on a plate.

11. The brake according to claim 9, wherein the wedge element interacts with a thrust-bearing element which likewise has a wedge face.

12. The brake according to claim 1, wherein a pretensioning device is provided by means of which the two cam disks are pretensioned relative to one another in the direction of the emergency release position.

13. The brake according to claim 12, wherein the pretensioning device comprises at least one spring element.

14. The brake according to claim 1, wherein the cam disks have a service brake position, in which the cam disks are intermediately spaced in relation to one another.

15. The brake according to claim 14, wherein in the service brake position of the cam disks a torque acts which seeks to bring about a rotation of the cam disks relative to one another in the direction of the emergency release position.

16. The brake according to claim 1, wherein the cam disks have a parking brake position, in which the cam disks are widely spaced in relation to one another.

17. The brake according to claim 16, wherein in the parking brake position, no torque acts which seeks to produce a rotation of the cam disks relative to one another.

18. The brake according to claim 1, wherein the readjustment device and the emergency release device are arranged serially in a force flux path of the application force or of a force derived therefrom.

19. The brake according to claim 1, wherein the cam disk which is not fixedly connected to the spindle is rotatably mounted.

20. The brake according to claim 1, wherein the cam disks have an emergency release position, in which the cam disks are closely spaced in relation to one another.

21. The brake according to claim 1, wherein rolling elements are provided between the cam disks.

22. The brake according to claim 1, wherein the cam disks are axial cam disks.

23. The brake according to claim 1, wherein the inclination of the cam disks in the service brake position is configured such that the torque generated by the application force is substantially lower than the breakaway torque of the spindle.

24. The brake according to claim 1, wherein the inclination of a cam segment adjacent to the parking brake position is chosen such that the torque generated by the cam disks is significantly higher than the breakaway torque of the spindle.

25. The brake according to claim 1, wherein only a single motor is provided for actuating both the readjustment device and the emergency release device.

26. The brake according to claim 1, wherein the brake is a self-energizing brake.

27. The brake according to claim 1, wherein the actuator provided is an electric actuator.

28. The brake according to claim 1, wherein the inclination of a cam segment adjacent to the emergency release position is chosen such that the torque generated by the cam disks is greater than the breakaway torque of the spindle.

29. The brake according to claim 1, wherein in the service brake position, a position regulation is executed in respect of the cam position.

* * * * *